(12) United States Patent
Koseki

(10) Patent No.: US 7,174,367 B2
(45) Date of Patent: Feb. 6, 2007

(54) INFORMATION PROVIDING METHOD AND INFORMATION PROVIDING APPARATUS FOR NETWORK

(75) Inventor: Akira Koseki, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 09/829,623

(22) Filed: Apr. 10, 2001

(65) Prior Publication Data

US 2002/0049758 A1    Apr. 25, 2002

(30) Foreign Application Priority Data

May 15, 2000    (JP) .............................. 2000-142118

(51) Int. Cl.
G06F 15/16    (2006.01)
G06Q 99/00    (2006.01)

(52) U.S. Cl. ........................................ 709/207; 705/52

(58) Field of Classification Search ................ 709/203, 709/204, 206, 217, 234; 725/8, 5; 705/14, 705/27, 52
See application file for complete search history.

(56) References Cited

U.S. PATENT DOCUMENTS

| | | | |
|---|---|---|---|
| 5,835,087 A * | 11/1998 | Herz et al. .................. 715/810 |
| 5,907,837 A * | 5/1999 | Ferrel et al. .................... 707/3 |
| 5,933,811 A * | 8/1999 | Angles et al. ................. 705/14 |
| 6,070,176 A * | 5/2000 | Downs et al. .............. 715/513 |
| 6,256,664 B1 * | 7/2001 | Donoho et al. ............. 709/204 |
| 6,275,988 B1 * | 8/2001 | Nagashima et al. ........... 725/8 |
| 6,298,307 B1 * | 10/2001 | Murphy et al. ................. 702/3 |
| 6,557,007 B1 * | 4/2003 | Pekowski et al. ......... 707/104.1 |

* cited by examiner

*Primary Examiner*—Thomas Pham
(74) *Attorney, Agent, or Firm*—Ido Tuchman; Anne Dougherty

(57) ABSTRACT

A master content generation unit generates information (master content) that is concretized based on the original idea of a content generator. An intermediate content generation unit re-constructs a complete and concrete content that has an adequate amount of information at a lower level, and generates a content to be sold. When a purchaser (a buyer) issues a request for a desired level, such as for the amount of information, to the intermediate content generation unit via the new content requesting unit, the content is re-constructed in accordance with the request. A content retailing unit provides a price for the master content and the content that is generated by the intermediate content generation unit, and collects the requested purchase price from a buyer. The buyer may select content equivalent to the compensation that corresponds to the buyer's request, and may purchase it from the content retaining unit.

26 Claims, 11 Drawing Sheets

INFORMATION PROVIDING METHOD AND INFORMATION PROVIDING APPARATUS FOR NETWORK

FIELD OF THE INVENTION

The present invention relates to an information providing method and an information providing apparatus for a network, and particularly to an information providing method and an information providing apparatus for providing content via a network.

BACKGROUND OF THE INVENTION

Conventionally, for the dissemination of product information to customers, a distribution system employs store displays or publishes catalogs containing the images of products, and to evaluate such items that are thus offered for sale a shopper actually looks at or touches them, or watches and listens to images and sounds that they produce. However, since product information is selected and provided only in one direction, from the provider side, sometimes immaterial and unwanted information may be presented. Under the circumstances, however, because of the many variables involved, it is difficult for an information provider to resolve this problem and to prepare a broad spectrum of example operations or uses that would be attractive to all prospective customers.

As the current information communication infrastructure has developed, personal computers (PCs), which have rapidly been integrated into networks, have come to be used as information terminals and to facilitate the exchange of information on a wide variety of subjects. Recently, the Internet has been popularly accepted as a network that all can easily use, and PC users need only acquire communication devices to be able to join in the exchange activities that the Internet makes available, i.e., to engage in the bi-directional exchange of information. And when information can be exchanged bi-directionally between information providers and users, by taking advantage of the benefits accruing from the use of a network, it should be possible to distribute via a network information (content) users desire.

However, since it is difficult to prepare in advance information that a user may desire, to date, the information that is distributed across networks continues to reflect the intent and the motivation of providers. And it is difficult for a user to obtain what he or she considers appropriate information.

Further, only a small range of information concerning experiences and methods is distributed, because it is difficult to establish a trading plan that would permit such information to be handled on a network. That is, since it is difficult to use a medium such as printed matter, or a facility at a specific location, for trading engaged in by an unspecified large number of participants, a public space, such as a network, may be regarded as the place for trading.

Currently, trading tends to be performed via networks, and the trading method used, such as a charge sale or an auction sale, is proposed as an example of how to exchange assets. However, when the trading is in such assets as information, where value is lost once the asset is opened for perusal, a safe and efficient trading method or charge method has yet to be established, so that it is difficult to set up a trading method that is suitable for a public place.

SUMMARY OF THE INVENTION

To resolve the above shortcomings, it is one object of the present invention to provide an information processing method and an information processing apparatus for a network that can easily provide the information that a user desires.

It is another object of the present invention to make it easy to structure data so that appropriate information can be provided in response to a request from a user.

According to the present invention, based on conditions that are defined in advance, a finite number of intermediate contents are generated for content that corresponds to an entire body of information, at least one of the intermediate contents can be selected, and information at a selected level provided.

Specifically, an information providing method for a network according to the present invention provides, via a network, content that constitutes an entire body of information. Then, since the content is the entire body of information, the information can be divided into discrete steps corresponding to multiple levels, and part of the information can be extracted from the content and modified. For example, the structuring of information is easy, and information can be hierarchically structured in consonance with established levels that permit it to be opened for perusal and used for presentations. Thus, the presentation of hierarchical information will enable the establishment of safe and efficient trading procedures. That is, since partial and highly abstract information space can be hierarchically shifted to provide a complete and very. concrete information space, information required by a user can be presented by shifting the hierarchical level.

Information contained in the content can be employed as the intermediate content. It is preferable that this be part of the included information and represent the characteristic of the content. Since the information that can be submitted is part of that contained in the content and is employed as the intermediate content, the amount of the information in the content that is to be provided can be reduced and easily presented. The amount of the information can be increased by adding a constant amount of additional information or certain predetermined information to the information in the content. If the information of that employed for the intermediate content that can be easily introduced is supplemented, depending on the case, the structuring of the information may be facilitated, or the information requested by the user may be presented.

Information obtained by changing at least a part of the information included in the content is employed as the intermediate content. When the intermediate content is to be generated, the characteristic of the content may become apparent by changing, as needed, at least a part of the information in the content, rather than employing only a part of the information. Therefore, when information obtained by changing at least a part of the information included in the content is employed, the amount of information in the content to be provided can be reduced and easily presented, and the intermediate content can be provided as information that better represents the characteristic. The amount of information may be increased by adding a constant amount of information or predetermined information to the information in the content.

A condition determined in accordance with a request from a user is defined as the condition that is defined in advance In some cases, originally a user does not desire to receive all of the contents. For example, a user may select a desired content from among multiple contents by referring to a characteristic portion, such as a summery or an abstract. However, the characteristic portion desired by the user, i.e., the portion contained in the request from the user, is not always constant. Thus, when intermediate contents at a finite number of levels are generated under conditions determined in accordance with a request from a user, the intermediate content, including the characteristic portion desired by the user, can be obtained.

In this case, it is preferable that an intermediate content be selected at a level that corresponds to the condition determined in accordance with the request from the user. Thus, the intermediate content that includes the characteristic portion that the user desires can be selected.

A condition for reducing or increasing the amount of information in the content is defined as the condition that is defined in advance. The content that constitutes the entire body of information contains a large amount of information. Therefore, when the reduction of the amount of information in the content, such as the separation of information from the content, extraction of one part of information or the modification of information is employed as a condition, the structuring of information becomes easy and the volume of the information desired by a user that is provided is small. The amount of information is increased by adding a constant amount of information or predetermined information to the information in the content. And if that portion of the information in the intermediate content that can be easily introduced is supplemented, depending on the case, the structuring of the information may be facilitated, or information requested by the user may be presented.

A condition for extracting an information type that represents the content can be employed as the condition determined in advance. The content may include multiple types of information. For example, document information, such as image information or text information, and control information, such as command and linking information, may coexist. When only an arbitrary type of information is extracted from these different types of information, the characteristic of the content can be represented. Therefore, when the extraction of an information type that represents the content is used as a condition, information desired by the user can be presented easily and quickly.

Price information can be provided for the contents, and compensation information based on the price information can be provided for each of the intermediate contents at the levels that are generated. When a constant charge is provided for an event, such as a reference to the content, it is preferable that a charge also be provided for the intermediate content that is generated from the content. For example, hierarchical intermediate contents are generated in accordance with the level whereat the information is opened for perusal. Since the price information is submitted together with the content, and since the compensation information is presented together with the hierarchical intermediate content, a user can evaluate the information by referring to the charge as a scale, and therefore, can obtain the content or the intermediate content that was requested. Therefore, the trading can be established safely and efficiently. In accordance with the payment of the charge, the partial and abstract information space is shifted to the completed and very concrete information space, so that the user can obtain necessary information. Further, when a user pays a market participation fee or a charge for obtaining information, a profit may be realized.

The information providing method for a network can be implemented by the following information providing apparatus. Specifically, the information providing apparatus comprises: storage means for storing content that constitutes an entire body of information; connection means for connecting the content to a network so as to provide the content; generation means for, based on a condition determined in advance, generating intermediate contents at a finite number of levels relative to the content; and output means for selecting and outputting at least one of the intermediate contents.

The generation means can employ information included in the content to generate intermediate contents at a finite number of levels.

The generation means can employ information obtained by changing at least a part of the information included in the content to generate intermediate contents at a finite number of levels.

The generation means includes input means for receiving a request from the user, and a condition designated in accordance with the request can be employed as the condition determined in advance.

The output means can select an intermediate content at a level that corresponds to the condition designated in accordance with the request from the user.

The generation means can generate the intermediate contents by defining, as the condition determined in advance, a reduction or an increase in the amount of information contained in the content.

The generation means can generate the intermediate contents by defining, as the condition determined in advance, extraction of an information type that represents the content.

The information providing apparatus further comprises: price storage means for storing the content in correlation of with price information; and compensation means for providing compensation information that is based on the price information for each of the intermediate contents at the levels that are generated.

DETAILED DESCRIPTION OF A PREFERRED EMBODIMENT

The preferred embodiment of the present invention will now be described in detail while referring to the accompanying drawings. In this embodiment, an information supplying side is defined as a seller and an information demanding side is defined as a buyer, and the embodiment is applied to the exchange of data, with an added charge, between the seller and the buyer across a network.

Figure 1:
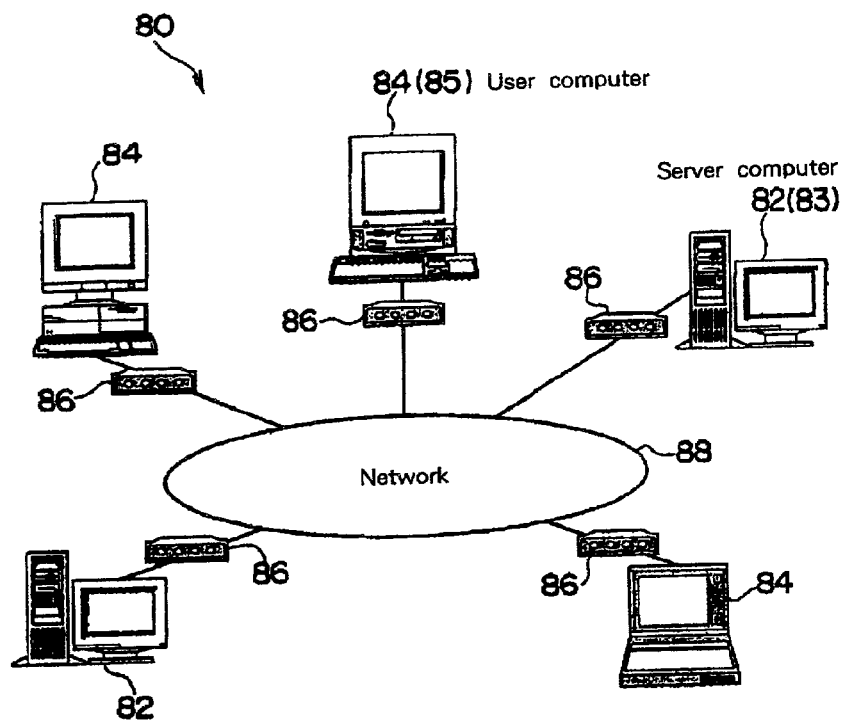
FIG. 1 is a schematic block diagram showing the configuration of a network according to the embodiment of the present invention.

FIG. 1 is a schematic diagram illustrating a network system according to the present invention. As is shown in FIG. 1, a network system 80 is so designed that multiple computers 82 in charge for the same seller or different sellers and multiple computers 84 in charge for the same buyer or different buyers are connected to a network (e.g., the Internet) 88 via connection devices 86, such as modems, routers or TAs (Terminal Adapters). The computers 82 and 84 are interconnected and can exchange data via the network 88.

When the Internet is employed as the network 88, as well known, at least one of the computers 82 or 84 can serve as a WWW (World Wide Web) server and the remaining computers can serve as WWW clients.

As is shown in FIG. 1, one of the computers 82 serves as a computer (hereinafter referred to as a server computer) 83 that provides various information, and one of the computers 84 serves as a computer (hereinafter referred to as a user computer) 85 that is operated by a user to issue an information level request. In this embodiment, this arrangement is employed as an example in order to simplify the explanation. While only one user computer 85 and one server computer 83 are employed for this embodiment, the present invention is not thereby limited, and multiple user computers and server computers may be provided.

Figure 2:
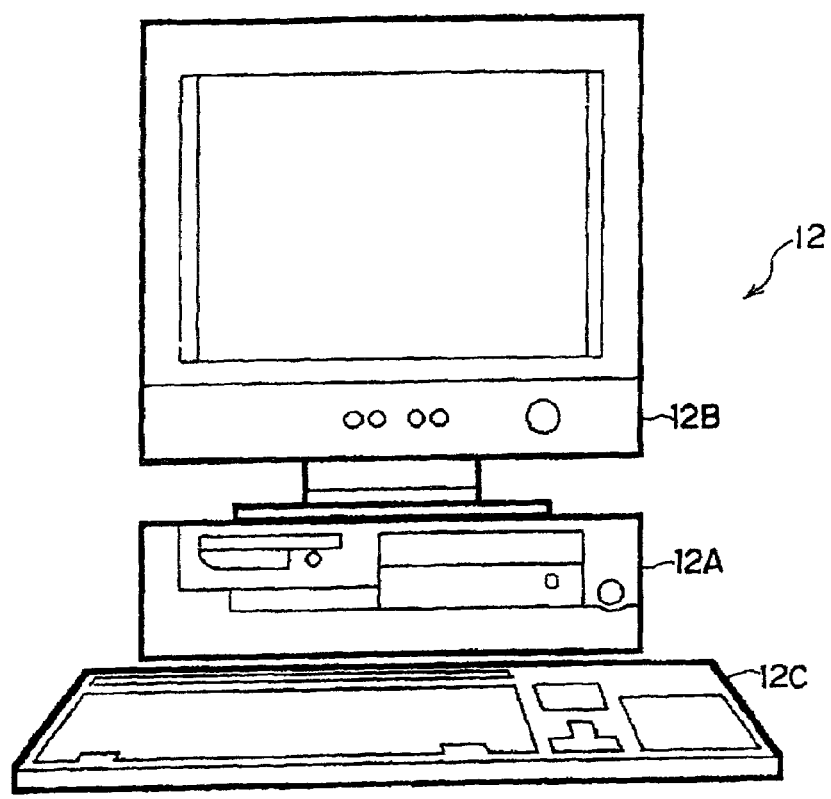
FIG. 2 is a perspective view of the external appearance of a desktop PC.

FIG. 2 is a schematic diagram showing the configuration of the computer system 10, a typical personal computer (PC) 12 that is appropriate for the present invention for the easy exchange of data between the seller and the buyer across the network. The PC 12 conforms to the OADG (PC Open Architecture Developer's Group) standards, and is a desktop computer on which "Windows 98", "Windows NT" or "Windows 2000" by Microsoft, or "OS/2" by IBM is mounted as an operating system (OS). The individual sections of the computer system 10 will now be described. Since the PC 12 has an ordinary general purpose hardware arrangement, no detailed explanation of it will be given and only the main function relative to the embodiment will be described.

Figure 3:
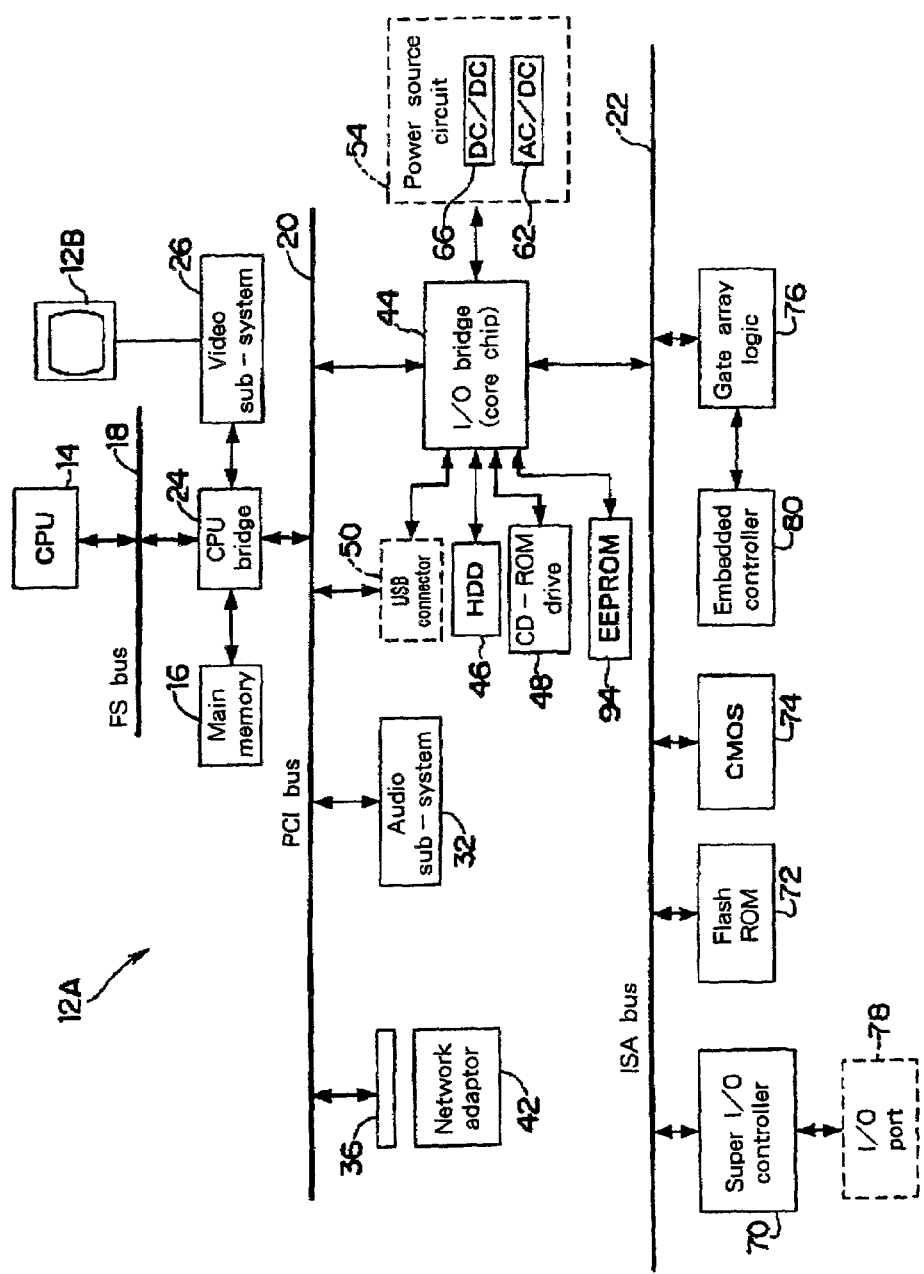
FIG. 3 is a schematic block diagram showing the configuration of a computer system according to the embodiment.

The PC 12 of the computer system 10 includes a computer main body 12A, a CRT 12B and a keyboard 12C. As is shown in FIG. 3, the computer main body 12A includes a CPU 14, and executes various programs under the control of the OS. The CPU 14 may be, for example, a "Pentium", "MMX Technology Pentium" or "Pentium Pro" CPU chip by Intel, a "PowerPC" CPU chip by IBM, or a CPU chip produced by another company, such as AMD. In this embodiment, the CPU 14 is interconnected to the hardware components via an FS (FrontSide) bus 18, which is a processor bus that is directly connected to the external pin of the system, a PCI (Peripheral Component Interconnect) bus 20, which is a high-speed I/O device bus, and an ISA (Industry Standard Architecture) bus 22, which is a low-speed I/O device bus.

The FS bus 18 and the PCI bus 20 are connected together by a CPU bridge (host-PCI bridge) 24 that includes a memory controller function, for controlling access to a main memory 16, and a data buffer, for absorbing the difference in data transfer speeds between the FS bus 18 and the PCI bus 20. The main memory 16 is read/write memory, and is used as an area from which CPU 14 executable programs are read, or as a work area wherein the processing data produced by the executable programs are written.

The executable programs include the OSs, such as Windows 98, various device drivers required for the operation of peripheral devices by hardware, application programs for specific operations, and firmware, such as a BIOS (a Basic Input/Output System: one part of a program used to control the input/output operations performed by hardware such as a keyboard or a floppy disk drive) that is stored in a flash ROM 72.

In a video sub-system 26 that performs a video associated function, a video controller, provided to perform the actual processing of drawing commands issued by the CPU 14, temporarily stores in video memory (VRAM) drawing data it receives and later reads from the VRAM and outputs to the CRT 12B (see FIG. 2). To assist in the processing of the drawing data, a digital-analog converter (DAC) is additionally provided that the video controller employs to convert digital video signals into analog video signals, which are thereafter output, via a signal line, to a CRT port (not shown).

An audio sub-system 32 and a mini PCI slot 36 are connected to the PCI bus 20, and a network adaptor 42, which can be inserted into the mini PCI slot 36, is provided for connecting the computer system 10 to a network (e.g., a LAN).

The PCI bus 20 and an ISA bus 22 are interconnected by an I/O bridge 44 that furnishes a function for bridging the PCI bus 20 and the ISA bus 22, a DMA controller function, a programmable interrupt controller (PIC) function, a programmable interval timer (PIT) function, an integrated drive electronics (IDE) interface function, a universal serial bus (USB) function, a system management bus (SMB) interface function, and a real time clock (RTC). The DMA controller function transfers data between peripheral devices (e.g., FDDs) and the main memory 16 without using the CPU 14 as an intermediary. The PIC function executes a predetermined program (interrupt handler) in response to an interrupt request (IRQ) from a peripheral device. And the PIT function generates a timer signal that has a predetermined, programmable cycle.

An IDE hard disk drive (HDD) 46 is connected to the IDE interface, which is activated by the IDE interface function, and an IDE CD-ROM drive 48 is connected to an AT Attachment Packet Interface (ATAPI). Another type of IDE drive, such as a digital video disc or a digital versatile disc (DVD) drive, may be connected instead of or in addition to the IDE CD-ROM drive 48.

A USB port is provided for the I/O bridge 44, and is connected to a USB connector 50 that is formed in the wall of the main body of the PC 12. USB devices that can be connected using the USB connector 5 are, for example, a keyboard, a mouse, a joystick, a scanner, a printer, a modem, a display monitor or a tablet. An EEPROM 94 is connected via the SM bus to the I/O bridge 44 to store information, such as the password of a user and a product serial number.

A Super I/O controller 70, an EEPROM flash ROM 72, a CMOS 74, a gate array logic 76, and a low-speed peripheral device (not shown), such as a keyboard/mouse controller, are connected to the ISA bus 22. An I/O port 78 is connected to the Super I/O controller 70. The Super I/O controller 70 drives a floppy disk drive (FDD) and controls the input/output (PIO) of parallel data via a parallel port and the input/output (SIO) of serial data via a serial port. And in this embodiment, the connection device 86, used for a connection to the network 88 (FIG. 1), is connected via an I/O port 78 to the Super I/O controller 70.

The flash ROM 72, the contents of which are electrically rewritable, is a non-volatile memory for holding a program, such as BIOS. And the CMOS 74 functions as non-volatile and high-speed storage means that is constituted by connecting a volatile semiconductor memory to a backup power source.

The I/O bridge 44 is connected to a power supply circuit 54. And the power supply circuit 54 includes an AC/DC converter 62 and a DC/DC converter 66, for generating a constant direct-current voltage, such as 5 V or 3.3 V, that is used by the computer system 10.

In addition to the electric circuits described above, many others are required to constitute the computer system 10. However, since these components would be well known to one having ordinary skill in the art, and are not related to the subject of the invention, no explanation for them will be given in this specification. Further, to avoid complexity in the drawings, between hardware blocks only partial connections are shown.

Figure 4:
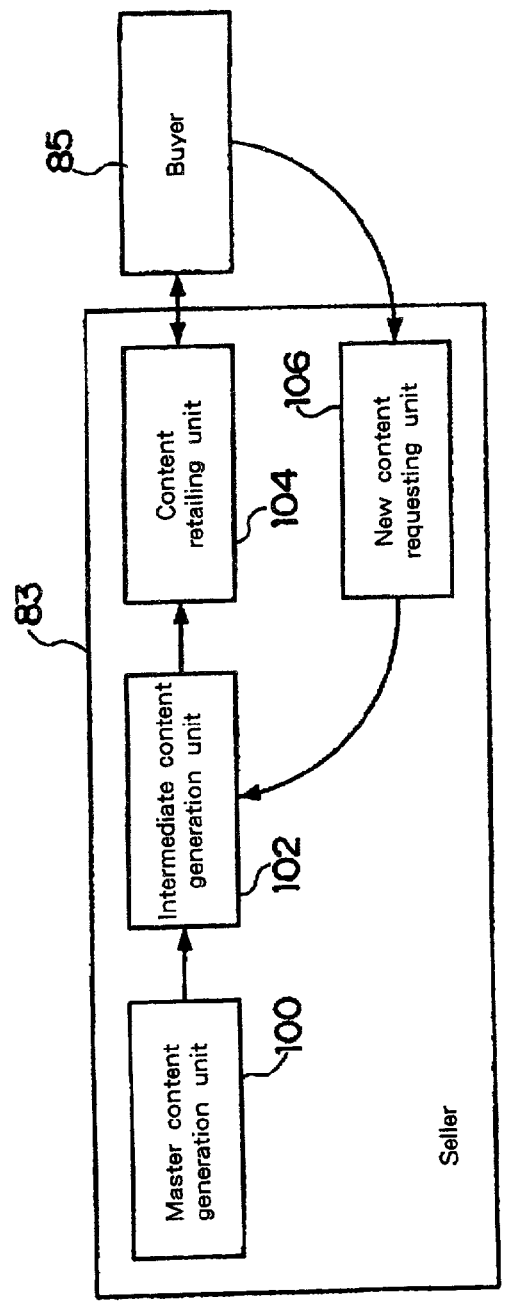
FIG. 4 is a functional block diagram showing a seller using a computer.

FIG. 4 is a functional block diagram showing a seller using the thus arranged computer system. The server computer 83, the seller, comprises: a master content generation unit 100, an intermediate content generation unit 102, a content retailing unit 104 and a new content requesting unit 106.

The master content generation unit 100 is a functional unit for generating concrete information (master content) based on an original idea provided by a content generator. The intermediate content generation unit 102 is a functional unit for employing the master content, based on a request from a buyer or the intent of the content generator, to re-construct intermediate content that includes at least one level, i.e., the amount of information at a lower level, of completeness and concreteness, and for generating a content for the sale. This content on sale includes the master content. The content retailing unit 104 is a functional unit for providing a price for the content for the sale, i.e., the master content and the intermediate content that is generated by the intermediate content generation unit 102, and for accepting a purchase request from the buyer. The buyer (the user server 85) selects a content for which his or her request and the price for payment are balanced, and purchases the content from the content retailing unit 104. The new content requesting unit 106 is a functional unit for requesting from the intermediate content generation unit 102 at least one of the levels, i.e., the amount of information, completeness and concreteness that he or she requests.

Figure 5:
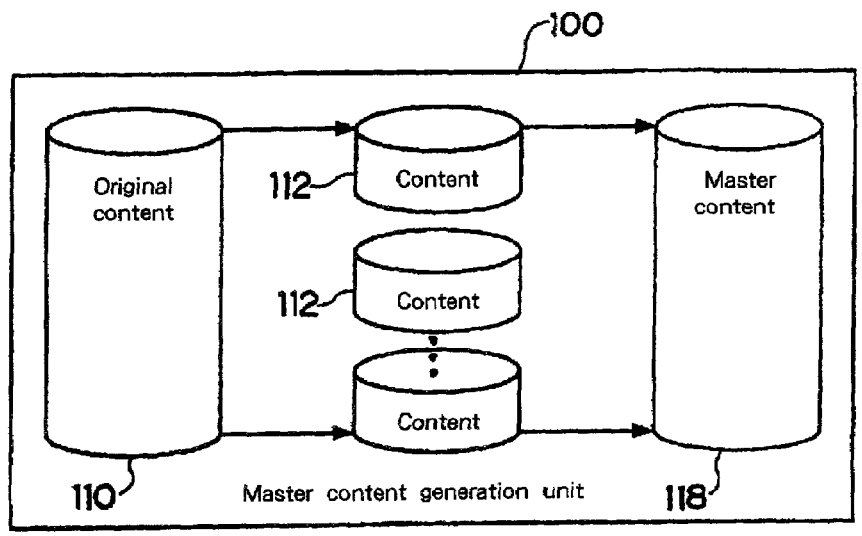
FIG. 5 is a diagram for explaining the content generation performed by a master content generation unit.

As is shown in FIG. 5, based on the original idea when an original content 110 was generated, the master content generation unit 100 concretizes or re-constructs multiple contents 112 that are included in the original content 110, and generates a master content 118. This processing for generating the master content 118 may be determined in advance. Further, the master content 118 may be generated by concretizing or re-constructing the contents under a condition that is determined in advance in accordance with the information included in the original content 110. As the predetermined condition, the original idea at the content generation time may be provided for each of the contents 112. Therefore, when the image information is a content, the master content including the original idea, e.g., a master content of a so-called director's cut, can be generated.

Figure 6:
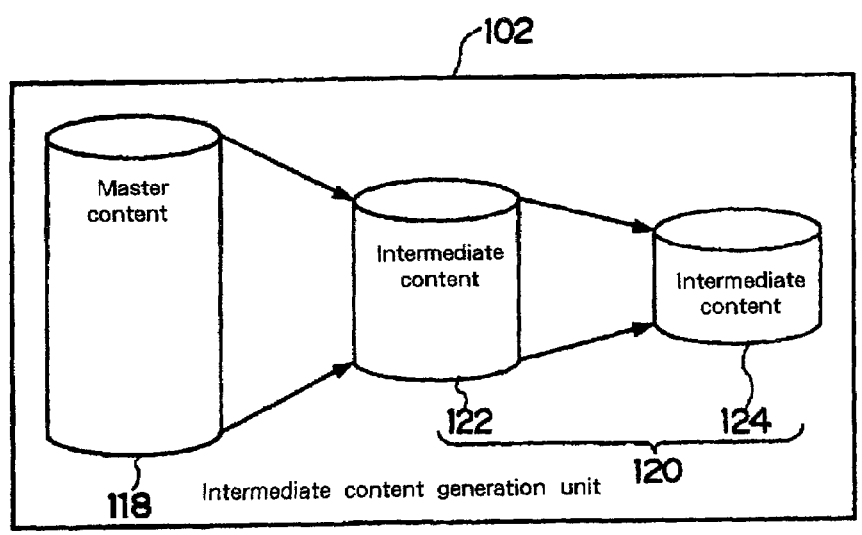
FIG. 6 is a diagram for explaining the content generation performed by an intermediate content generation unit.

FIG. 6 is a diagram showing the image of an intermediate content that is generated by the intermediate content generation unit 102. In FIG. 6, intermediate contents 122 and 124 for which the amount of information is at a lower level (i.e., a smaller amount of information) are generated from the master content 118.

Figure 7:
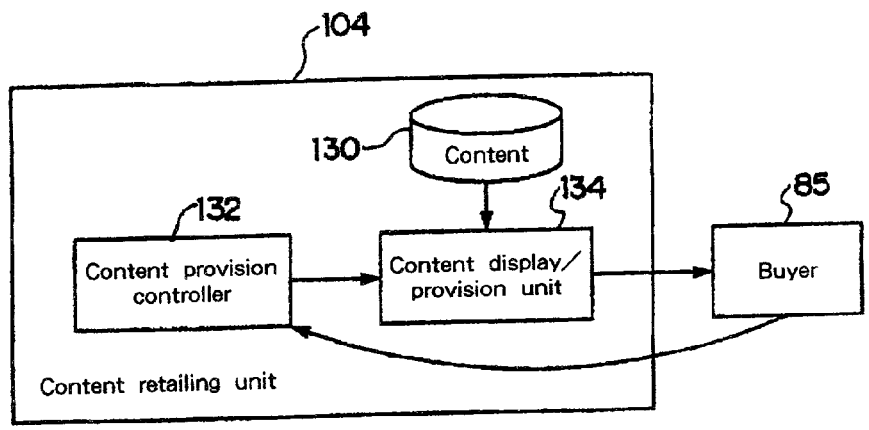
FIG. 7 is a conceptual block diagram showing the configuration of a content retailing unit.

FIG. 7 is a conceptual diagram showing the arrangement of the content retailing unit 104. The content retailing unit 140 includes a content 130, a content presenting controller 132 and a content display/provision unit 134. The content 130 includes the master content 118 and all the intermediate contents 120 that are generated by the intermediate content generation unit 102. The content presenting controller 132 submits the information for the content in accordance with the request from the buyer. Upon the receipt of the request from the content presenting controller 132, the content display/provision unit 134 provides, for the buyer, the price of the content and the amount of information, or the information itself, that is included in the content 130.

The master content generation unit 100 corresponds to the storage means of this invention, and the connection device 86 corresponds to the connection means of this invention. The intermediate content generation unit 102 corresponds to the generation means of the invention, and the content retailing unit 104 corresponds to the output means of the invention, while the new content requesting unit 106 corresponds to the input means of the invention. The intermediate content generation unit 102 also includes the function of the provision means of this invention.

Operation of the Embodiment

The operation of this embodiment will now be described. In this embodiment, document information for a report or a reference document is handled as a product that constitutes a content. Further, in this embodiment, the server computer 82 serves as a WWW (World Wide Web) server, and the user computer 84 serves as a WWW client. In this case, a network accessible program (a so-called WWW browser) is installed in the user computer 84, and when the WWW browser is activated, the user computer 84 can access the server computer 83 via the network 88. The access location (data consisting of the location of the server computer 82 and the location of information in the server computer 82) is designated by a so-called URL (Uniform Resource Locator).

Figure 8:
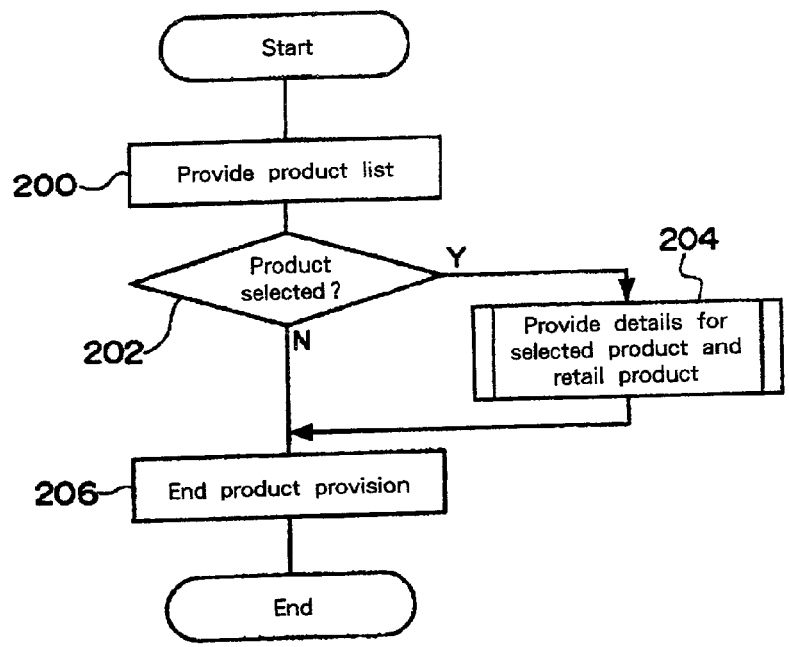
FIG. 8 is a flowchart showing the processing performed by the content retailing unit that constitutes a server computer.
Figure 9:
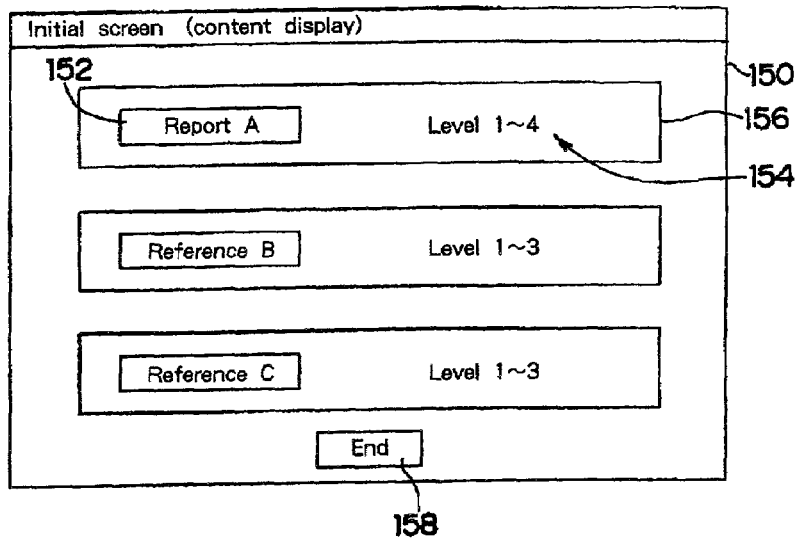
FIG. 9 is a diagram showing an example screen displayed by a user computer.

When the user computer 85 issues an access request to the server computer 83, the server computer 83 performs the process routine in FIG. 8. Specifically, the processing routine in FIG. 8 is performed by the content retailing unit 104 of the server computer 83. At step 200 in FIG. 8, a list is displayed of the products that are stored as contents in the server computer 83. In other words, the data are transmitted to the user computer 85. FIG. 9 is a diagram showing an example display for the user computer 85. A screen 150 includes content areas 156, each of which corresponds to a headline and consists of a selection button 152, whereon the name of a product is displayed, and an area 154 wherein the range in which the level of the product falls is displayed as an index. The content areas 156 that are displayed are equivalent in number to the products (three in this embodiment) that are stored as contents in the server computer 83. Further, a button 158 for instructing the termination of the processing is provided at the bottom of the screen 150. The buyer, the user, selects one of the product headlines on the screen 150 (clicks on one of the buttons 152) to instruct a shift from the screen to another and to terminate the purchasing stage.

When none of the products on the screen 150 are targeted for purchase, the buyer clicks on the button 158 to terminate the purchase processing.

At step 202 in FIG. 8, a check is performed to determine whether one of presented products is selected. In FIG. 9, this decision is performed to determine whether one of the buttons 152 and 158 has been clicked on. When button 152 on the user computer 85 has been clicked on, the decision at step 202 is affirmative, and program control advances to step 204, whereat the details of the selected product are displayed and the retailing process is initiated. When button 158 is clicked on, however, the decision at step 202 is negative, and program control shifts to step 206, whereat the presentation of products is ended and the processing routine is thereafter terminated.

Figure 10:
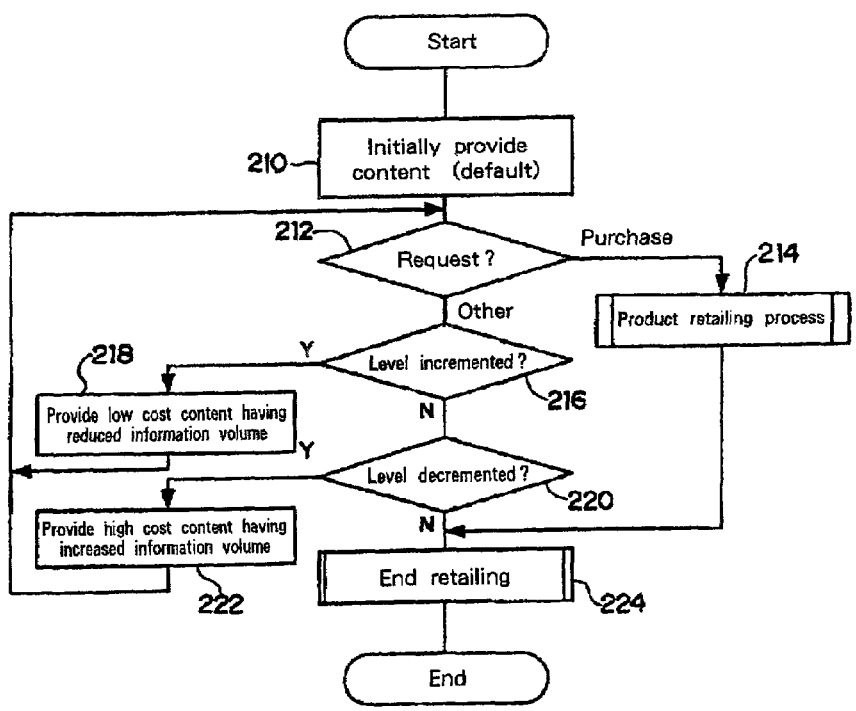
FIG. 10 is a flowchart showing a detailed display for a selected product and for retailing processing.
Figure 11:
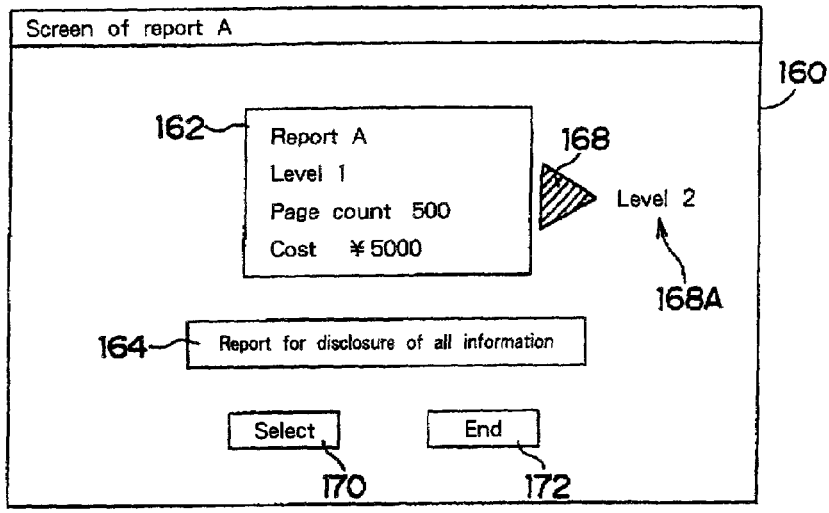
FIG. 11 is a diagram showing an example screen displayed as an initial state by the user computer.

The processing performed at step 204 in FIG. 8 will now be described in detail. When the processing at step 204 in FIG. 8 is performed, the processing routine in FIG. 10 is begun, and at step 210 a default content is displayed in the initial state. FIG. 11 is a diagram showing an example screen whereon the default content is displayed as the initial state. A screen 160 includes an area 162 in which relevant data for a product are displayed, an area 164 in which the state of the product (the state of the product at the current level) is displayed, and an instruction button 168 for incrementing the level. Located near the instruction button 168 is a display area 168A in which is displayed the level that was instructed by clicking on the button 168. The screen 160 also includes, at the bottom, a selection button 170 for selecting a product at the current level and for instructing its purchase, and a button 172 for instructing the termination of the processing.

The data displayed in the area 162 are so-called properties of the content, and consist of a name, a level, the number of pages and a price. In FIG. 11, the number of pages and the price of a content at the highest level for a product (report A) are displayed. The instruction button 168 is an area for displaying and instructing another level for the same product, and in the example in FIG. 11, when the user, a buyer, is not satisfied with the content presented on the display, he or she can click on the instruction button 168 and display a content at the next lower level (level 2 in this case). The area 164 wherein the state of the product (the state of the product at the current level) is displayed provides a brief explanation for the content, and serves as an auxiliary screen the user can employ to determine whether to purchase this content.

When the default content has been displayed, program control advances to step 212 in FIG. 10, whereat whether or not a request has been issued by the buyer is determined. That is, at step 212, a check is performed to determine whether the buyer has actually indicated a desire to purchase the content on the display or has issued another request. When the selection button 170 has been clicked on, it is assumed that a purchase instruction was issued, and program control advances to step 214. Then, the purchase process is initiated with a charge that matches the content at the current level.

When a request other than one submitted by clicking on the selection button 170 has been issued, program control shifts to step 216, and a check is performed to determine whether the buyer has requested a content having a lower cost and a smaller amount of information than those available for the content that is displayed. When the decision at step 216 is affirmative, a content having a lower cost and a smaller amount of information is displayed at step 218, and program control thereafter returns to step 212. When the decision at step 216 is negative, program control advances to step 220, and a check is performed to determine whether the buyer has requested a content having a higher cost and a greater amount of information than those available for the content that is displayed. When the decision at step 220 is affirmative, a content having a higher cost and an increased amount of information is displayed at step 222, and program control thereafter returns to step 212. When the decision at step 220 is negative, program control shifts to step 224, and for the present the retailing processing is terminated. Then, program control shifts to the processing performed to satisfy the request of the buyer, as will be described later.

Figure 12:
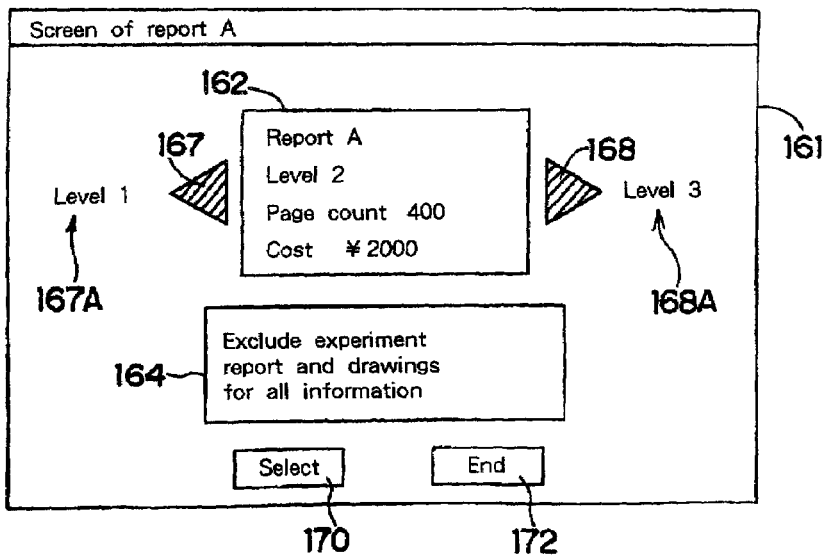
FIG. 12 is a diagram showing an example screen when the content in FIG. 11 is displayed at level 2.

FIG. 12 is a diagram showing an example screen when the content in FIG. 11 is displayed at level 2. Differences between FIG. 12 and FIG. 11 are the data for the product in area 162 and the state of the product (the state of the product at the current level) in area 164, and that, in order to reduce the level, an instruction button 167 is provided to the left of the area 162 where the properties of the content are displayed. Located near the instruction button 167 is a display area 167A in which is displayed the level that was instructed by clicking on the button 167. Therefore, when the buyer clicks on either instruction button 167 or 168, the product at another level can be displayed. That is, when the buyer is not satisfied with the product currently presented on the display, he or she can easily increment or decrement the content level and display the content at a desired level.

Figure 13:
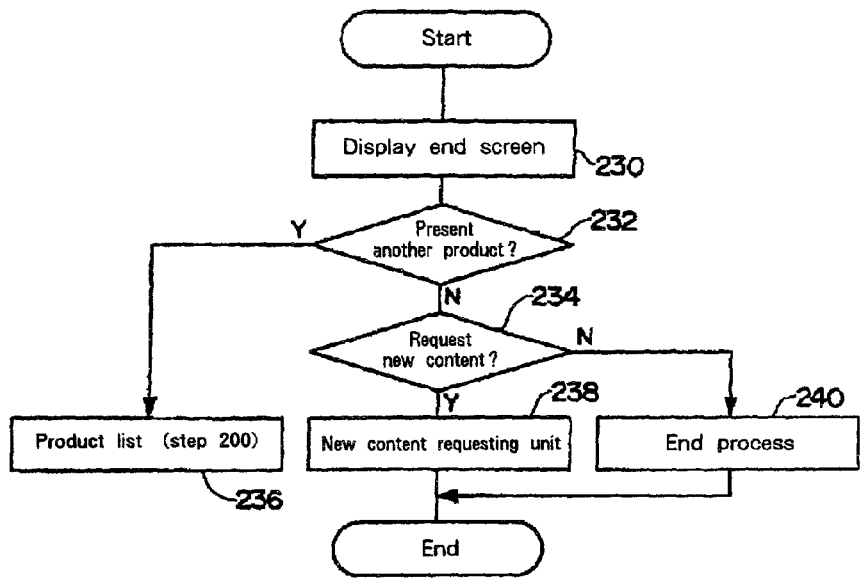
FIG. 13 is a flowchart showing the content retaining end process.
Figure 14:
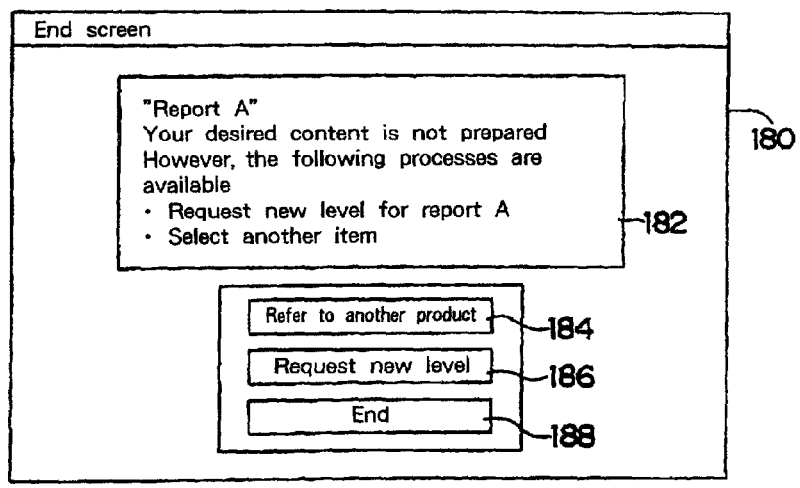
FIG. 14 is a diagram showing an example screen that is initially displayed during the content retailing end process.

The process at step 224 in FIG. 10 will now be explained in detail. When program control advances to step 224 in FIG. 10, the process routine in FIG. 13 is initiated, and at step 230 an end screen is displayed. FIG. 14 is a diagram showing an example end screen that the user computer 85 displays. An end screen 180 includes a display area 182, a reference button 184 for another product, a button 186 for requesting a new level and an end button 188. The display area 182 is used to display a message asking whether the current process should be shifted to the next process or whether the current process should be terminated. The reference button 184 is an instruction button the buyer uses to instruct the presentation of another product. The new level request button 186 is used to request the display of another level of the current product (report A, in this case), and when it is clicked on, program control is shifted to the new content requesting unit 106. The end button 188 is used by the buyer to instruct the termination of the purchase processing when he or she does not desire to view another product or a new level.

When the display of the end screen 180 is terminated, program control advances to step 232 in FIG. 13, and a check is performed to determine whether the buyer has requested the presentation of another product. When the decision at step 232 is affirmative, program control advances to step 236, and a list of products is displayed. Program control thereafter returns to step 202 in FIG. 8. The process at step 236 corresponds to the process at step 200 in FIG. 8, and at step 236, the list of products (report A, in this case), excluding any selected products is displayed.

When the decision at step 232 is negative, program control advances to step 234, and a check is performed to determine a new content, i.e., a content at a new level is requested. When the decision at step 234 is affirmative, program control advances to step 238 to instruct the shifting of the process to the new content requesting unit 106, and the processing is thereafter terminated. However, when the decision at step 234 is negative, at step 240 an end process is performed to terminate the processing performed by the content retailing unit 104, and the processing is thereafter terminated.

Figure 15:
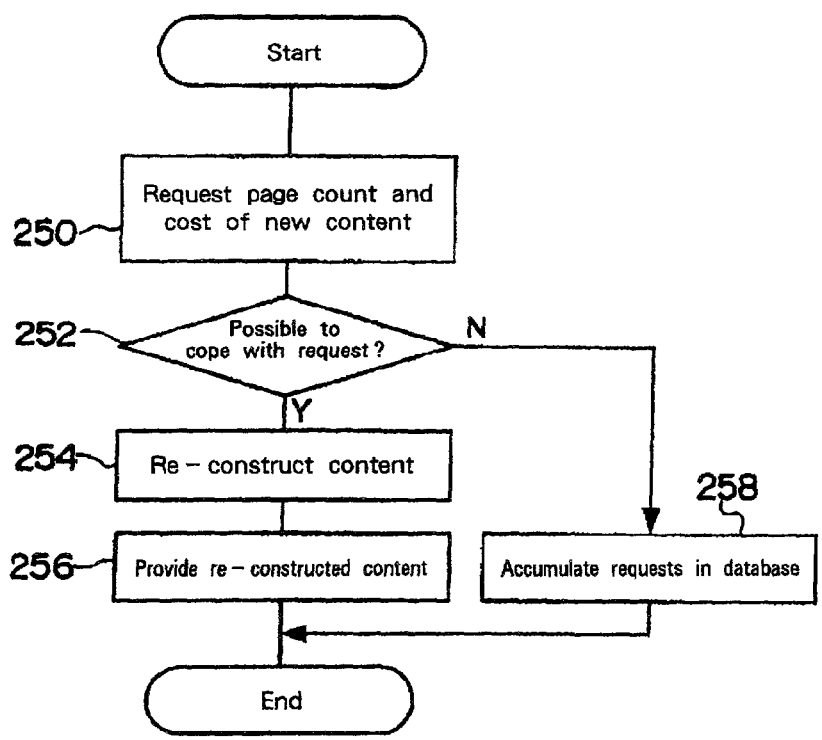
FIG. 15 is a flowchart showing the processing performed by a new content requesting unit.

An explanation will now be given for a case wherein a new content, i.e., a content at a new level, is requested (step 238) and program control is shifted to the new content requesting unit 106. The new content requesting unit 106 performs the processing routine shown in FIG. 15. At step 250 in FIG. 15, the reception of a request for the number of pages and the cost to be assessed is waited for. That is, at step 250, the number of pages and the cost to be assessed is received as a content at a new level that has been requested by a buyer. In this case, a request for the number of pages and an assessed cost is issued; however, a request for an information type may be issued instead. For example, the type of text data or word processor data used for character code or an image data type may be requested.

Figure 16:
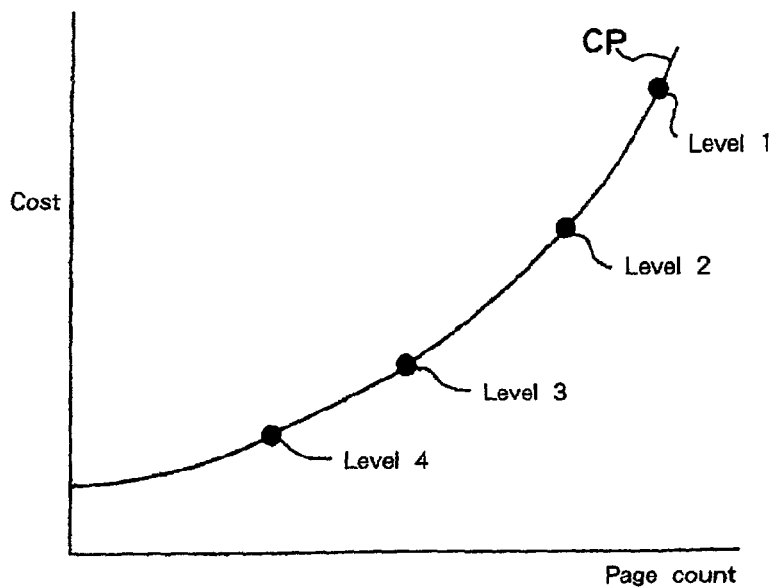
FIG. 16 is a characteristic graph showing an example initial screen that is displayed by a buyer computer and that can be processed by the new content requesting unit, and that indicates a correlation between the number of pages and the cost of a product (report A).

FIG. 16 is a diagram showing an example initial screen, displayed by the computer of a buyer, that can be processed by the new content requesting unit 106. Multiple levels (four levels, in this case) are determined in advance for the product (report A, in this case), and through an interpolation or an approximation process, the characteristic CP can be obtained by using the correlation between the number of pages and the assessed cost. This characteristic CP corresponds to information value of the product (report A). Therefore, when the buyer designates the request for the characteristic CP, he or she can request a new level. Further, designation of a request for a new level can be issued by physically interacting with the input device of the computer (e.g., a mouse) and by changing the location of the level.

At step 252, a check is performed to determine whether the number of pages and the assessed cost that have been requested (received) can be coped with by the seller side. In this case, this determination can be easily obtained by examining whether the number of pages or the assessed cost are included in a permissible range that has been defined in advance. That is, whether the location on the characteristic CP that has been requested is determined. When the level at the location out of the characteristic CP has been requested, the location is converted or projected onto one point on the characteristic CP, and in this case, when the decision at step 252 is affirmative, the location is converted or projected onto one point on the characteristic CP. Program control thereafter advances to step 254.

At step 254, the content is re-constructed. Since the level requested by the buyer is located near the conventional level or on the characteristic CP, only the content at the conventional level need be re-constructed, so that the level requested by the buyer can be provided. In this case, a new content can be provided immediately. Therefore, at step 256 the new content, i.e., the re-constructed content, is presented, and the processing is terminated. Thereafter, program control advances to step 200 in FIG. 8, and a list of the products using the re-constructed content is displayed. Thereafter, the above described process is repeated.

Figure 17:
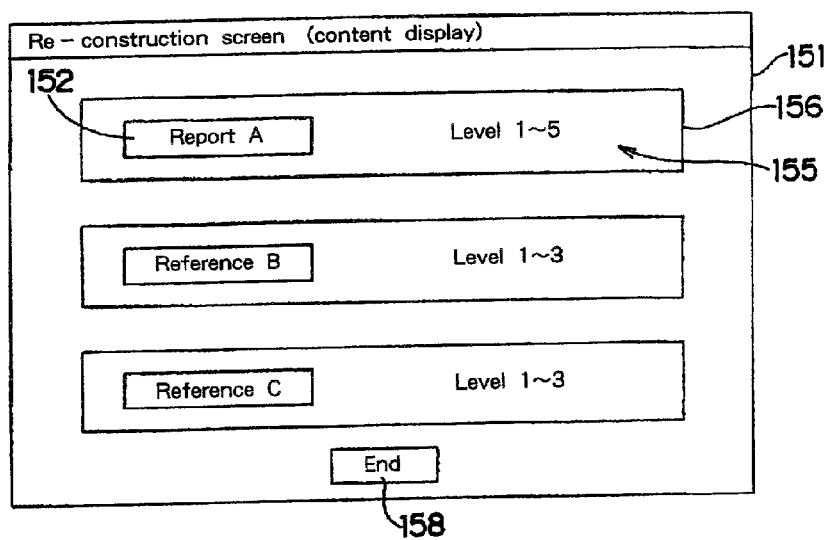
FIG. 17 is a diagram showing an example screen for a list of products that is displayed by the user computer and that includes a new content that has been re-constructed.

FIG. 17 is a diagram showing an example screen, displayed by the user computer 85, for the list of products including a new content that has been re-constructed. The difference between a screen 151 in FIG. 17 and the screen 150 in FIG. 9 is that the area 154, whereat the range of the level of the product (report A) in FIG. 9 is displayed as an index, is changed into an area 155, wherein the range (1 to 5) that includes the level of the new content obtained by re-construction is displayed as an index.

When the decision at step 252 is negative, i.e., when the level requested by the buyer is too far from the conventional level, in this embodiment, the new content is not immediately provided, and the request from the buyer is stored in the database, so that the intermediate content generation unit 102 can use it as a reference for a future determination. Since the requests are accumulated in this manner, a content generator can develop a content at a new level relative to many requested levels. And the new level obtained by the development can be provided for the buyer by the content retailing unit 104.

As is described above, in this embodiment, ease in structuring information is employed, and upon the receipt of a request from a buyer, a seller can hierarchically structure information in accordance with the level provided for the opening of information for perusal. When the provision of the hierarchical information for the buyer is controlled by the business body, trading between the buyer and the seller can be safely and efficiently established. And as the buyer prepares to pay a charge, the partial and highly abstract information space can be shifted to the complete and very concrete information space, so that the user can obtain necessary information. The seller charges for its participation in the market and the acquisition of information, and can thus realize a profit.

Valuable information can be exchanged safely and efficiently among a large, unspecified number customers, and a large market, including multiple buyers, can be constructed. And when the seller charges for the establishment of the trading site, he or she can receive compensation regardless of the amount of information.

In this embodiment, the relationship between the seller and the buyer has been explained. However, a market owner may be positioned between the seller and the buyer. For example, a market owner (a market management body) may open a market on the network (a public place), collect requests from buyers and opens them in public. For a purchase request that has been opened, a seller can appropriately change his or her information, and submit hierarchical information. The submitted information need not include all the information that is finally required, and a complete exposure of information may be obtainable only through personal negotiation.

Of the information that is submitted, the market owner may open only that which is the most abstract and provides only partial information. Thereafter, a buyer selects from the partial information that information which seems to satisfy his or her request, and purchases, from the market owner, access to more complete and concrete information. More complete and concrete information can be obtained by information browsing or by interaction with the owner of information. When information at a higher level than that which is obtained by a buyer is prepared, the same processing is performed. And the seller is compensated for the information directly, through personal negotiation, or by the feedback of sales that is consonant with the number of accesses. Using this method, trading between a buyer and a seller can be safely and efficiently implemented.

More specifically, the market owner opens a homepage, and accepts all requests from buyers. Then, the market owner opens the purchase requests on the homepage, and accepts retailing offers from sellers. In this case, a seller must appropriately structure his of her own data, and provide structured information. From among the information that is submitted, the market owner selects the most abstract and partial information and opens it on the homepage, and subsequently opens a link to more precise, higher data as it is added. This link is so designed that it interacts with a charge card system, and when the link is clicked on, the charge is withdrawn from the account of a buyer. When the buyer is satisfied with low level information that is provided, he or she halts the trading processing, but when the buyer is dissatisfied with the information that is provided, he or she pays more to obtain more precise, higher information. Thereafter, the market owner pays the seller an amount of money that is calculated by subtracting a commission fee from a sale that has been contracted for by a user clicking on the link.

As is described above, the trading of valuable information can be performed safely and efficiently among a large, unspecified number of persons, and a broadly based market can be opened. Therefore, when a market owner imposes a charge on the establishment of an on-line trading market, he or she can realize a profit.

As is described above, according to the present invention, since the content is the entire body of information, information can be divided into discrete steps corresponding to multiple levels, one part of the information is extracted, or modified, so that intermediate content can be generated and provided via a network. Thus, partial and highly abstract information space can be easily shifted to complete and very concrete information space, and information requested by a user can be presented.

The invention claimed is:

1. An information providing method embodied in computer memory for providing, via a network, content based on conditions that are defined in advance, comprising the steps of:
   generating a finite number of intermediate documents for content that corresponds to an entire body of information, wherein said intermediate documents are hierarchically structured according to a total number of pages contained in each of the intermediate documents;
   assigning each of said finite number of intermediate documents an information level based on the number of pages contained therein;
   selecting at least one of said intermediate documents; and
   providing the at least one of said selected intermediate document.

2. The information providing method according to claim 1, wherein information contained in said entire body of information is employed as said intermediate document.

3. The information providing method according to claim 2, wherein information obtained by changing at least a part of said information included in said document is employed as said intermediate document.

4. The information providing method according to claim 3, wherein a condition determined in accordance with a request from a user is defined as said condition that is defined in advance.

5. The information providing method according to claim 4, wherein an intermediate document is selected at a level that corresponds to said condition determined in accordance with said request from said user.

6. The information providing method according to claim 5, wherein a condition for reducing or increasing the amount of information in said document is defined as said condition that is defined in advance.

7. The information providing method according to claim 6, wherein a condition for extracting an information type that represents said document is employed as said condition determined in advance.

8. The information providing method according to claim 7, wherein price information is provided for said documents, and compensation information based on said price information is provided for each of said intermediate documents at said levels that are generated.

9. The information providing method according to claim 1, further comprising associating a content price for each of the intermediate documents based on the number of pages contained therein.

10. The information providing method according to claim 1, further comprising providing a grammatical description of the amount of information contained in said finite number of intermediate documents.

11. The information providing method according to claim 1, wherein the entire body of information includes text information.

12. An information providing computer apparatus comprising:
   storage means for storing content that constitutes an entire body of information in computer readable memory;
   connection means for connecting said content to a network so as to provide said content;
   generation means for, based on a condition determined in advance, generating intermediate documents at a finite number of levels relative to said content, wherein said intermediate documents are hierarchically structured according to a total number of pages contained in each of the intermediate documents;
   means for assigning each of said finite number of intermediate documents an information level based on the number of pages contained therein;
   selecting means for selecting at least one of said intermediate documents; and
   outputting at least one of said selected intermediate documents.

13. The information providing apparatus according to claim 12, wherein said generation means employs information included in said content to generate intermediate documents at a finite number of levels.

14. The information providing apparatus according to claim 13, wherein said generation means employs information obtained by changing at least a part of the information included in said content to generate intermediate documents at a finite number of levels.

15. The information providing apparatus according to claim 14, wherein said generation means includes input means for receiving a request from said user, and a condition designated in accordance with said request is employed as said condition determined in advance.

16. The information providing apparatus according to claim 15, wherein said output means selects an intermediate document at a level that corresponds to said condition designated in accordance with said request from said user.

17. The information providing apparatus according to claim 14, wherein said generation means generates said intermediate documents by defining, as said condition determined in advance, a reduction or an increase in the amount of information contained by said document.

18. The information providing apparatus according to claim 17, wherein said generation means generates said intermediate documents by defining, as said condition determined in advance, extraction of an information type that represents said document.

19. The information providing apparatus according to claim 18, further comprising:
   price storage means for storing said document in correlation of with price information; and
   compensation means for providing compensation information that is based on said price information for each of said intermediate documents at said levels that are generated.

20. The information providing apparatus according to claim 12, further comprising a price storage unit configured to associate a content price for each of the intermediate documents based on the number of pages contained therein.

21. The information providing apparatus according to claim 12, further comprising means for providing a grammatical description of the amount of information contained in said finite number of intermediate documents.

22. The information providing apparatus according to claim 12, wherein the entire body of information includes text information.

23. A computer program product embodied in computer memory comprising:
   computer readable program codes stored in the computer memory for providing, via a network, content that constitutes an entire body of information based on conditions that are defined in advance, the computer readable program codes configured to cause the program to:
   generate a finite number of intermediate documents for content that corresponds to an entire body of information, wherein said intermediate documents are hierarchically structured according to a total number of pages contained in each of the intermediate documents;
   assign each of said finite number of intermediate documents an information level based on the number of pages contained therein;
   select at least one of said intermediate documents; and
   provide the at least one of said selected intermediate document.

24. The computer program product according to claim 23, further comprising program codes configured to cause the program to provide a description of the amount of information contained in said finite number of intermediate documents.

25. The computer program product according to claim 23, further comprising program codes configured to cause the program to associate a content price for each of the intermediate documents based on the number of pages contained therein.

26. The computer program product according to claim 23, wherein the entire body of information includes text information.

* * * * *